United States Patent [19]

Thomson

[11] 4,319,790
[45] Mar. 16, 1982

[54] WATER LUBRICATED SLEEVE BEARINGS

[76] Inventor: George A. Thomson, 875 Warwick Ave., Burlington, Ontario, Canada, L7T 3Y4

[21] Appl. No.: 922,055

[22] Filed: Jul. 5, 1978

[30] Foreign Application Priority Data

Jul. 7, 1977 [CA] Canada ................................. 282244

[51] Int. Cl.$^3$ ........................ F16C 27/02; F16C 33/20
[52] U.S. Cl. ..................................... 308/238; 252/12; 308/DIG. 8; 308/DIG. 12
[58] Field of Search ................. 308/238, 240, DIG. 8, 308/DIG. 12; 29/149.5 C, 149.5 S, 149.5 NM; 252/12, 12.2

[56] References Cited

U.S. PATENT DOCUMENTS

| | | | |
|---|---|---|---|
| 1,961,536 | 6/1934 | Thiry | 29/149.5 NM |
| 2,381,270 | 8/1945 | Enz | 308/238 |
| 3,344,064 | 9/1967 | Brady et al. | 252/12 |
| 3,383,144 | 5/1968 | Zapponi | 252/12 |
| 3,606,505 | 9/1971 | Satterthwaite et al. | 308/238 |
| 3,637,273 | 1/1972 | Orndorff, Jr. | 308/238 |
| 3,808,129 | 4/1974 | Lindlof et al. | 252/12 |
| 3,826,547 | 7/1974 | Finefrock | 308/238 |
| 3,942,850 | 3/1976 | Minard | 308/238 |
| 4,011,189 | 3/1977 | Keil | 252/12 |

FOREIGN PATENT DOCUMENTS

997326 9/1976 Canada.
1283534 2/1969 Fed. Rep. of Germany ... 308/DIG. 8

Primary Examiner—Richard R. Stearns

[57] ABSTRACT

A sleeve bearing is described which is useful for carrying the rotating propellor shaft of water craft, as well as for various industrial purposes. The sleeve bearing consists of a single homogeneous solid, hard elastomeric urethane polymer having a Shore D hardness of at least 60, a compressive modulus of elasticity at a 4% compressive strain of at least 50,000 psi and a dry dynamic co-efficient of friction against steel of no more than 0.20. This polymer is machined so as to fit within a cylindrical housing by means of a forced interference fit providing sufficient outward radial force by the outer surface of the sleeve on the housing to retain the bearing in movement-free fit during the operational life of the bearing.

2 Claims, 4 Drawing Figures

WATER LUBRICATED SLEEVE BEARINGS

BACKGROUND OF THE INVENTION

This invention relates to bearings and, more particularly, to water lubricated sleeve bearings for use in carrying the rotating propeller shaft of water craft, as well as for use as water lubricated "steady" bearings in various industrial applications such as agitator bearings or vertical pump bearings.

Rubber, in the general sense, possesses excellent wear resistance when operated against metals under fully hydrodynamic conditions and consequently resilient rubber has been employed very successfully for such purposes. Such rubber bearings are generally made from an oil-resistant chloroprene or nitrile polymer with a Shore A hardness of between 70 and 80. Rubber is bonded to a carrying shell of bronze, brass or stainless steel and the latter is secured by mechanical means to the housing to which it is fitted. In a modified design the metallic outer sleeve has been replaced by a non-metallic phenolic casing as described in U.S. Pat. No. 3,455,613 issued July 15, 1969. This modification was carried out principally to eliminate electrolysis and facilitate removal when required. These two disadvantages of metal-sleeved bearings have also been overcome by providing the bearing with an additional sleeve of rubber molded to the outer surface of the metal element as described in U.S. Pat. No. 2,839,340, issued June 17, 1958.

Rubber bearings must, of necessity, be rather long in relation to their diameter because the relatively low modulus of elasticity of rubber used will not permit unit pressure loadings much in excess of 35 psi (6Kg/cm$^2$). In most synthetic rubber compounds, in particular those commonly used in marine bearings, the level of hardness and consequently the compressive modulus is a function of the degree of carbon black or other filler loading in the rubber. The higher the filler loading, the harder the rubber and consequently, the higher the modulus. But this increase also carries an inverse relationship to the strength of the rubber in terms of tensile strength at break, ultimate elongation and wear resistance. The designer thus finds himself at cross purposes in the endeavour to compound an elastomer possessing good load support and high physical properties.

Problems with conventional rubber bearings also develop under certain operating conditions where full hydrodynamic lubrication does not occur. The result is a substantial squeal or howl, which prevents the use of these bearings in military craft where quiet operation is a necessity.

Because of the relatively high dry dynamic coefficient of friction of conventional rubber against metal, users are warned not to operate vessels with the bearings in a dry condition. In the inboard stern tube position a positive flow of water to conventional rubber bearings is essential to ensure a hydrodynamic film and prevent high bearing friction, temperature and rapid wear.

It is the principle object of this invention to provide a bearing capable of overcoming the shortcomings of conventional composite rubber/metal or rubber/reinforced plastic bearings.

SUMMARY OF THE INVENTION

According to this invention there is provided a sleeve bearing for mounting in a cylindrical housing bore in the form of a single homogeneous machinable solid, hard elastomeric urethane polymer having a Shore D hardness of at least 60, a compressive modulus of elasticity at a 4% compressive strain of at least 50,000 psi and a dry dynamic coefficient of friction against steel of no more than 0.20. This material is machined to very close tolerances so that it is fitted within the cylindrical housing bore by means of a forced interference fit providing sufficient outward radial force by the outer surface of the sleeve on the housing to retain the bearing in movement-free fit during the operational life of the bearing without the necessity of any extra mechanical fastening devices.

DESCRIPTION OF THE PREFERRED EMBODIMENTS

As examples of the urethane polymer that can be used in this invention there can be mentioned materials available from Thomson-Gordon Limited under the trademarks "Thordon XL" and "Thordon SXL". Of course, the invention is not restricted to that particular polymer and any solid, hard elastomeric urethane polymer meeting the above requirements can be used. This material has a very high compressive modulus of elasticity as compared with rubber which has a modulus of only in the order of 1,000 psi. It also has a very low dry dynamic coefficient of friction against steel as compared with conventional rubbers which have a typical coefficient of about 0.4 to 0.6. One of the most important characteristics of this material in terms of the present invention is its ability to be machined to very close tolerance such that it can be fitted within an existing cylindrical housing bore by means of an interference fit only. In fact, the material has sufficient strength that it can be driven into the housing bore by means of a sledge hammer. The simplicity of this type of fit has the great advantage of eliminating the need for set screws, flanges, adhesives or other mechanical fastening devices.

The urethane polymer used in this invention preferably has substantially homogeneously distributed therethrough a polyethylene wax in an amount of up to 10% by weight. It has also been found to be particularly desirable to use a polymer having a Shore hardness of from 650 to 800, with a polymer which is the reaction product of a polyether or polyester with a polyisocyanate being particularly preferred.

The bearing may be in the form of a single cylindrical member or it may be comprised of a plurality of arcuate segments together forming a sleeve machined to fit by interference fit within the cylindrical housing bore. In assembling the plurality of segments, the last segment to be inserted acts as a key and it must be driven in with sufficient force to provide the required interference fit.

Removal of the bearing can be facilitated by providing one or more axially bored and tapped holes extending into the end of the bearing. Where the bearing is made up of a series of segments, it may be sufficient to have a bored and tapped hole in only one segment. Then, for withdrawing the bearing an eye bolt is threaded into the tapped hole so that the entire bearing or a key segment can be pulled out when it is desired to remove the bearing. Corrosion between the housing and the outer face of the bearing is avoided by the very tight interference fit and the continued elastomeric flexibility enables circumferential compression of the bearing during removal with no danger of damage to the housing.

While L/D ratios 4:1 are common for elastomer marine bearings, this invention permits the use of ratios as low as 1.5:1 . This smaller ratio permits a much greater degree of shaft flexibility and/or hull bending. On high speed hydrofoil vessels, for instance, where three bearing points could be out of alignment by several inches under flying conditions, short L/D ratios are very desirable. The bearing must, however, possess sufficient rigidity that the deflection of the elastomer is not excessive. The bearing of the present invention with several times the stiffness of conventional bearings permits these shorter ratios and consequently greater angular misalignment without dangerously high bearing stresses, induced shaft bending stresses or high wear of the fore and aft ends of the bearings.

It is often found in practice that bearing housing bores require re-machining to compensate for corrosion or other damage. Also, shaft liners may be reduced in diameter to compensate for wear or other damage. As the bearings according to the present invention can be machined from a mill shape, such as a tube or rod, to very precise dimensions, they can be made to provide a proper interference fit within housings of any special diameter.

Conventional soft elastomer composite bearings generate a water film between the shaft and bearing surface when the relative motion of the shaft surface passing over the bearing surface is sufficient to induce a fluid wedge. At slow speeds, surface to surface contact occurs yielding boundary lubrication conditions if not dry running. The very high unlubricated dynamic coefficients of friction of rubber against metal (0.6–0.8) makes operating under these conditions virtually intolerable. The bearings of this invention have a very low dry dynamic coefficient of friction against steel of less than 0.2 . Thus, they are inherently self-lubricating and these very low frictional values permit satisfactory bearing operation under conditions of very slow operation, starting, temporary loss of cooling water to an inboard stern tube bearing, unusually high bearing pressures as a result of damage, or operating while the vessel is out of water for inspection purposes. The high resistance to malleable deformation of the present bearing permits its operation under conditions of severe pounding which might be caused by a bent shaft, propeller or other forces.

Another feature of the bearing of the present invention which is made from a single homogeneous solid polymer results from the fact that the total radial wear-down allowance is not limited by the thickness of a rubber lining as in the case of a conventional composite bearing, but by the total wall thickness which is equal to one half the difference between the sleeve OD and housing bore. Normally bearings would be replaced before wearing to such a major extent, but under difficult conditions marine bearings have been allowed to wear substantially before repairs were effected. Shaft or shaft liner surface wear as a result of running against a metallic outer sleeve can produce costly damage.

Yet another advantage of the homogeneous construction of the present bearing resides in the fact that regardless of the quality of a mechanical adhesive bond between two dissimilar materials, such as rubber and naval brass or other conventionally used composite materials, failures can occur. The use of a single homogeneous structure eliminates any possibility of bond failures.

BRIEF DESCRIPTION OF THE DRAWINGS

Certain preferred embodiments of the present invention are illustrated by the attached drawings in which.

Figure 1:
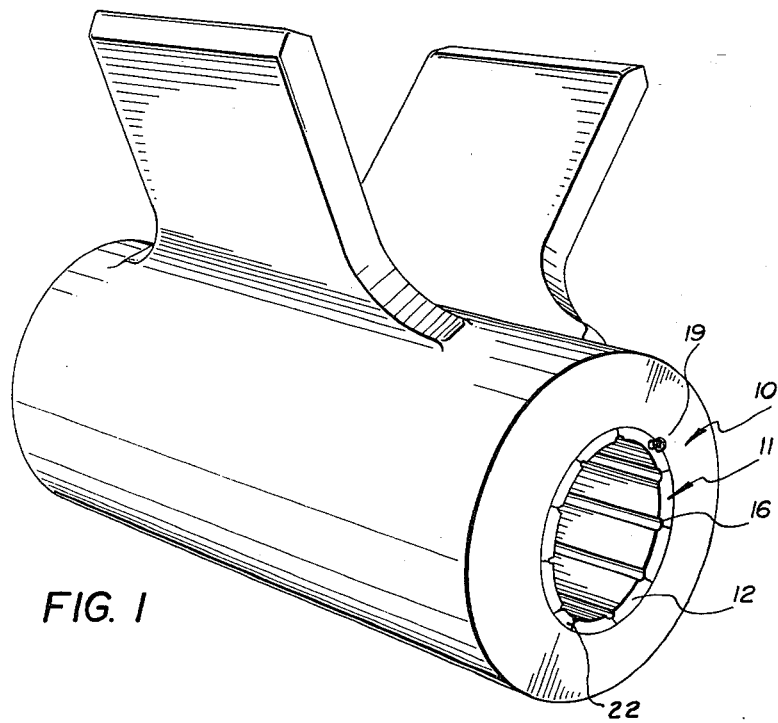
FIG. 1 is an isometric view of a bearing housing with a bearing inserted.
Figure 2:
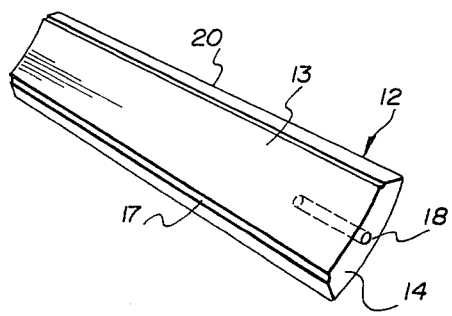
FIG. 2 is a perspective view of a bearing segment.
Figure 3:
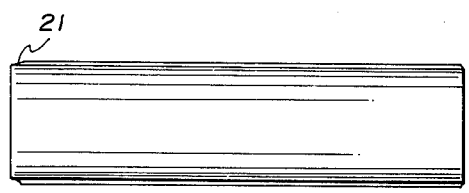
FIG. 3 is a plan view of a bearing key segment.
Figure 4:
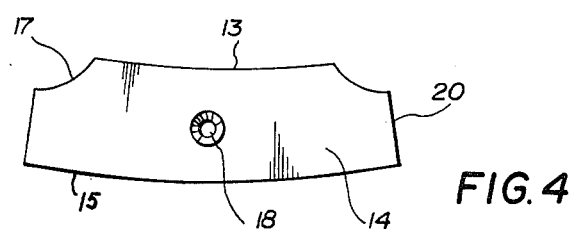
FIG. 4 is an end elevation of a removable segment.

As shown in the drawings, a bearing support (10) has a boring therein to receive a sleeve bearing 11. While the bearing can be in the form of a unitary cylindrical sleeve, in the drawings it is illustrated in the form of a series of segments 12. Each segment has an arcuate inner face 13, an arcuate outer face 15, ends 14 and radial edge faces 20. Axial water channels 16 are provided extending the length of the bearing and these are conviently made in the form of axial recesses 17 at the inner corners of each segment 12.

To assemble the segmented bearing, all of the segments except one are placed into position within the housing bore and then the key segment is forced into the remaining gap. To assist in the insertion of the key segment, it is convenient if the axial edges 20 are provided with chamfers 21 at an angle of about 5° to 10° and extending one or two inches from the inboard end of the segments. The chamfered end is then inserted into the remaining slot and then driven all the way into position.

To facilitate removal of the bearing, one or more bored and tapped holes 18 are formed into the end of the bearing. For a segmented bearing as shown in the drawings, it is sufficient to provide such a tapped hole in only one segment since, when it is removed, the remaining segments can all be easily moved by hand. For removal an eye bolt 19 is turned into the tapped hole.

According to an alternative embodiment, a metallic spline 22 (Fig. 1) may be fixed to the face of the housing bore. This spline is preferably both narrower and thinner than a segment 12 and can be in the form of a bronze spline bolted to the housing. The spline eliminates any possibility of rotational slipping of the bearing and by having the spline thinner than the segments, there is no direct contact between the shaft and the spline. With the spline in place, the segments are inserted as described hereinbefore by compressed interference fit. This extra fixed spline may be used in extraordinary circumstances where it is absolutely essential that there be no movement of the bearing relative to the housing during operation.

The embodiments of the invention in which an exclusive property or privilege is claimed are defined as follows:

1. A sleeve bearing for mounting in a cylindrical housing bore by means of an interference fit, said bearing consisting entirely of a single homogeneous solid, hard elastomeric urethane polymer having a Shore D hardness of at least 60, a compressive modulus of elasticity at a 4% compressive strain of at least 50,000 psi and a dry dynamic co-efficient of friction against steel of no more than 0.20, said bearing comprising a plurality of arcuate segments together forming a sleeve machined to fit within a cylindrical housing bore by means of a forced interference fit providing sufficient outward radial force by the outer surface of the segments on the housing to retain the segments in movement-free fit during the operational life of the bearing, said forced interference fit being the sole means of retaining the bearing within the housing.

2. A sleeve bearing according to claim 1, wherein at least one of said segments has a tapped hole extending longitudinally into one end of said segment, said tapped hole being adapted to receive a puller means for pulling the segment from the housing bore.

* * * * *